US012791105B2

(12) United States Patent
Takamatsu et al.

(10) Patent No.: US 12,791,105 B2
(45) Date of Patent: Nov. 10, 2026

(54) DISTRIBUTION VALVE

(71) Applicant: NORITZ CORPORATION, Hyogo (JP)

(72) Inventors: Shunta Takamatsu, Hyogo (JP); Ryoji Ouchi, Hyogo (JP)

(73) Assignee: NORITZ CORPORATION, Hyogo (JP)

( * ) Notice: Subject to any disclaimer, the term of this patent is extended or adjusted under 35 U.S.C. 154(b) by 66 days.

(21) Appl. No.: 19/080,906

(22) Filed: Mar. 16, 2025

(65) Prior Publication Data

US 2025/0297687 A1 Sep. 25, 2025

(30) Foreign Application Priority Data

Mar. 22, 2024 (JP) ................................ 2024-046471

(51) Int. Cl.
*F16K 11/085* (2006.01)
*F16K 5/18* (2006.01)
*F16K 27/06* (2006.01)

(52) U.S. Cl.
CPC .......... *F16K 11/0856* (2013.01); *F16K 5/188* (2013.01); *F16K 27/065* (2013.01)

(58) Field of Classification Search
CPC .... F16K 11/0853; F16K 11/0856; F16K 5/18; F16K 5/188
See application file for complete search history.

(56) References Cited

U.S. PATENT DOCUMENTS

| | | | | |
|---|---|---|---|---|
| 3,913,612 | A * | 10/1975 | Tolnai | F16K 5/0471 137/454.6 |
| 4,088,302 | A * | 5/1978 | Williams | F16K 3/04 251/368 |
| 4,557,464 | A * | 12/1985 | Gyurovits | F16K 3/08 251/312 |
| 12,276,341 | B2 * | 4/2025 | Ouchi | F16K 11/076 |
| 12,584,561 | B2 * | 3/2026 | Ouchi | F16K 11/085 |
| 2008/0223464 | A1 * | 9/2008 | Merrell | E04H 4/1209 137/625 |
| 2016/0319943 | A1 * | 11/2016 | Morein | F16K 5/18 |
| 2018/0372235 | A1 * | 12/2018 | Smith | F16K 27/065 |
| 2020/0173565 | A1 * | 6/2020 | Kusumoto | F16K 5/188 |

FOREIGN PATENT DOCUMENTS

| | | |
|---|---|---|
| JP | H0231963 | 2/1990 |
| JP | 4933855 | 5/2012 |

* cited by examiner

*Primary Examiner* — Reinaldo Sanchez-Medina
(74) *Attorney, Agent, or Firm* — JCIPRNET

(57) ABSTRACT

A distribution valve is provided, which includes a valve main body having first and second outlets and an inlet, a cylindrical valve body rotatably fitted into the valve main body, and a driver configured to rotate the valve body. The valve body has a peripheral wall portion and a bottom surface portion. The peripheral wall portion is formed with first and second opening portions configured to change opening areas of the first and second outlets. The bottom surface portion is formed with a third opening portion configured to change an opening area of the inlet. The distribution valve distributes fluid from the inlet to the first and second outlets. A seal member having a lip portion for adhering to the bottom surface portion is fitted into the inlet. The lip portion has a thickened portion facing the third opening portion immediately before an opening area of the inlet becomes zero.

4 Claims, 6 Drawing Sheets

DISTRIBUTION VALVE

CROSS-REFERENCE TO RELATED APPLICATIONS

This application claims the priority benefit of Japan Application No. 2024-046471, filed on Mar. 22, 2024. The entirety of the above-described patent application is hereby incorporated by reference herein and made a part of the present specification.

BACKGROUND

Technical Field

The disclosure relates to a distribution valve that performs distribution control of fluid, and particularly relates to a distribution valve equipped with a function to adjust the distribution ratio of fluid, a flow rate adjustment function to adjust the total flow rate, and a closing function to make the total flow rate zero.

Description of Related Art

Conventionally, a hot water supply device has been utilized that heats low-temperature tap water with a heating portion using combustion heat, and adjusts the temperature for hot water supply by mixing this heated high-temperature water with tap water. The hot water supply device controls the heating capacity in the heating portion to adjust the temperature of the high-temperature water, and also adjusts the mixing ratio of high-temperature water and tap water to adjust the temperature of the hot water supply.

For example, in Patent Document 1 (Japanese Patent No. 4933855), a mixing valve is described having a cylindrical valve body with an opening in the peripheral wall and an open bottom portion, and a valve main body that rotatably accommodates this valve body. In the valve main body, inlet ports for two fluids such as water and hot water are formed at positions corresponding to the peripheral wall of the valve body, and an outlet port is formed at a position corresponding to the bottom portion of the valve body.

The mixing valve of Patent Document 1, by rotating the valve body, changes the opening area of the peripheral wall with respect to two inlet ports, and adjusts the mixing ratio of fluids introduced from the two inlet ports. Such a mixing valve may be applied as a mixing valve in a hot water supply device that mixes heated high-temperature water and non-heated tap water.

The hot water supply device includes a type that distributes the supplied tap water to a heating portion and a bypass passage that bypasses this heating portion by means of a distribution valve, and supplies hot water by mixing high-temperature water heated in the heating portion with non-heated tap water from the bypass passage. In such a hot water supply device, the mixing ratio of high-temperature water and tap water is adjusted by adjusting the distribution ratio in the distribution valve. For example, the mixing valve of Patent Document 1 is used by making the outlet port the tap water inlet port and using the two inlet ports as two tap water outlet ports. That is, it is possible to use as a distribution valve by reversing the flow direction of the fluid.

In a hot water supply device having a distribution valve, for example, when supplying hot water at about 60° C. by heating tap water at a low temperature of about 5° C., there may be cases where the heating capacity is insufficient due to the large flow rate of hot water. In such cases, by supplying all the tap water to the heating portion and reducing the flow rate of tap water supplied to the hot water supply device, although the total flow rate decreases, hot water at the set temperature may be supplied.

However, the mixing valve in Patent Document 1 or the distribution valve with the reversed flow direction of this mixing valve does not have a function to adjust the total flow rate of the mixed hot and cold water, or a closing function to reduce the total flow rate to zero. Thus, in a hot water supply device that uses a mixing valve or distribution valve to mix high-temperature water and low-temperature water, it is common to arrange an opening/closing valve having a closing function at the water supply inlet of the hot water supply device, and to adjust the total flow rate by a flow rate adjustment valve arranged on the downstream side of the mixing valve or distribution valve.

On the other hand, the present applicant has already proposed a distribution valve equipped with a flow rate adjustment function and a closing function (e.g., Japanese Patent Application No. 2023-181621). This distribution valve has a cylindrical valve body having a peripheral wall portion in which opening portions corresponding to two outlet ports are formed and a bottom surface portion in which an opening portion corresponding to an inlet port is formed. Moreover, by rotating the valve body, the opening area of the two outlet ports is changed and the opening area of the inlet port is changed to adjust the distribution ratio and the total flow rate, thereby realizing a distribution ratio adjustment function, a flow rate adjustment function, and a closing function.

At this time, in order to prevent fluid leakage, it is necessary to seal by adhering a seal member to the bottom surface portion of the rotation valve body. The seal member is, for example, formed in a tubular shape like the packing in Patent Document 2 (Japanese Utility Model Laid-open Publication No. 02-031963), and the tap water that has passed through the tubular seal member is introduced into the valve body from the opening of the bottom surface portion.

However, the seal member that is adhered to the bottom surface portion of the valve body cannot avoid wear due to the rotation of the valve body. Especially due to the closing function, wear may progress rapidly in some cases. Thus, after long-term use, a gap may form between the seal member and the bottom surface portion, creating a risk of decreased closing function.

Thus, the disclosure provides a distribution valve that may suppress wear of the seal member caused by the closing function.

SUMMARY

The distribution valve of the disclosure according to the first aspect includes: a valve main body having a first outlet, a second outlet, and an inlet; a cylindrical valve body, rotatably fitted into the valve main body; and a driver configured to rotate the valve body through a valve shaft extending from a top surface portion of the valve body. The valve body has a peripheral wall portion that functions as a seal surface portion that closes the first outlet and the second outlet, and a bottom surface portion that functions as a seal surface portion that closes the inlet. The peripheral wall portion is formed with a first opening portion and a second opening portion configured to continuously change an opening area of the first outlet and an opening area of the second outlet by rotation of the valve body. The bottom surface portion is formed with a third opening portion configured to change an opening area of the inlet within a predetermined range by rotation of the valve body. The distribution valve distributes fluid flowing from the inlet into the valve body to the first outlet and the second outlet. A seal member having a lip portion for adhering to the bottom surface portion is fitted into the inlet. The lip portion has a thickened portion that is formed thicker than other parts at a part facing the third opening portion immediately before an opening area of the inlet becomes zero by rotation of the valve body.

According to the above configuration, the distribution valve distributes fluid introduced from the inlet into the cylindrical valve body to the first outlet and the second outlet. Then, by rotating the valve body, the distribution ratio and total flow rate are adjusted. At the inlet, a tubular seal member that contacts the bottom surface portion of the valve body is arranged. This seal member has a lip portion that adheres to the bottom surface portion of the valve body, and in the part of the lip portion that faces the third opening portion of the valve body when the opening area of the inlet becomes zero, a thickened portion that is thicker than other parts of the lip portion is formed. Since the thickened portion becomes more difficult to deform while maintaining sealing properties due to its increased thickness, when rotating the valve body to reduce the opening area of the inlet, it becomes less likely to be caught in the third opening portion, and wear caused by the closing function may be suppressed. Further, due to the increased thickness, the allowable wear amount to maintain sealing properties increases, and the durability of the distribution valve is improved.

For the distribution valve of the disclosure according to the second aspect, in the distribution valve according to the first aspect, the seal member is configured to be movable in an axial direction of the valve body and be pressed toward the valve body by a supply pressure of fluid acting on the inlet, such that the lip portion adheres to the bottom surface portion. According to the above configuration, the seal member receives the supply pressure of the fluid and moves toward the valve body, and the lip portion adheres to the bottom surface portion of the valve body. Thus, even if the lip portion wears, the lip portion may be made to adhere to the bottom surface portion, and the durability of the distribution valve is improved.

For the distribution valve of the disclosure according to the third aspect, in the distribution valve according to the first or second aspect, the bottom surface portion has a bar extending in a circumferential direction that divides the third opening portion, and the bar is configured to contact the thickened portion when an opening area of the inlet becomes minimum. According to the above configuration, when the opening area of the inlet is reduced by the rotation of the valve body, the thickened portion tends to be pulled into the third opening portion by the fluid flowing into the third opening portion, but the pulling of the thickened portion may be suppressed by the bar provided in the third opening portion extending in the circumferential direction. Thus, when the opening area of the inlet is reduced by rotating the valve body, the thickened portion of the lip portion is less likely to be caught in the third opening portion, and the wear of the lip portion may be suppressed.

DESCRIPTION OF THE EMBODIMENTS

Hereinafter, the aspects for implementing the disclosure are described based on the embodiments.

According to the distribution valve of the disclosure, it is possible to suppress wear of the seal member caused by the closing function.

Embodiment

First, the hot water supply device to which the distribution valve of the disclosure is applied is described.

Figure 1:
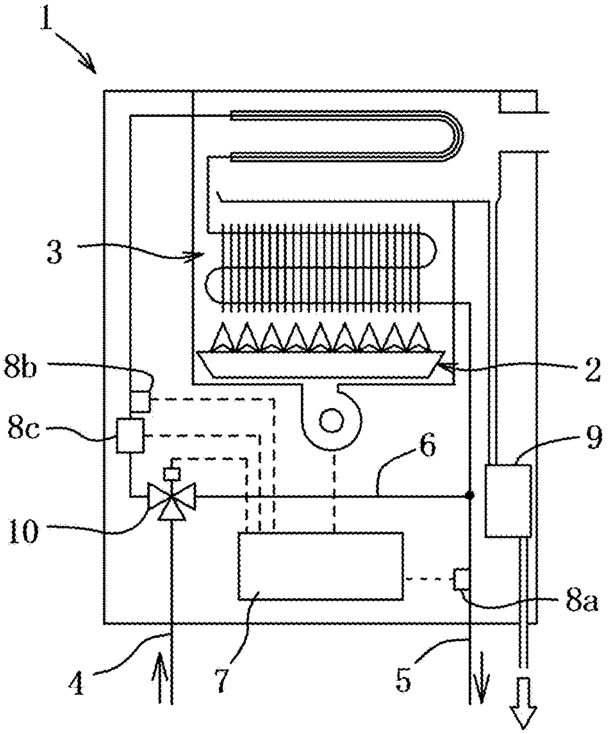
FIG. 1 is a configuration diagram of a hot water supply device equipped with a distribution valve according to an embodiment of the disclosure.

As shown in FIG. 1, the hot water supply device 1 is a combustion-type hot water supply device having a combustion device 2 provided with a burner, a blower fan, etc., and a heat exchanger 3, and is provided with a heating portion that heats tap water in the heat exchanger 3 by utilizing the combustion heat generated in the combustion device 2. This hot water supply device 1 includes a water supply passage 4 that supplies tap water to the heat exchanger 3, a hot water outlet passage that discharges hot water from the heat exchanger 3, a distribution valve 10 interposed in the water supply passage 4, a bypass passage 6 that branches from the water supply passage 4 at the distribution valve 10 and connects to the hot water outlet passage 5, a controller 7 that performs hot water supply control, and the like. The distribution valve 10 distributes the supplied tap water between the heat exchanger 3 side and the bypass passage 6 side that bypasses the heating portion. The heat exchanger 3 includes a latent heat recovery heat exchanger, and the hot water supply device 1 is equipped with a neutralizer 9 that neutralizes and drains strongly acidic condensate water contained in the combustion exhaust.

The hot water outlet passage 5 is equipped with a hot water temperature sensor **8*a* downstream of the joint with the bypass passage 6. The water supply passage 4 is equipped with a water supply temperature sensor 8*b* and a water supply flow rate sensor 8*c* downstream of the distribution valve 10. The controller 7 controls the combustion heat generated by the combustion device 2 and the distribution ratio of the distribution valve 10 based on the detected temperature of the water supply temperature sensor 8*b* and the detected flow rate of the water supply flow rate sensor 8*c*, so that the detected temperature of the hot water temperature sensor 8*a* becomes the set hot water temperature. The introduction flow rate (total flow rate) of tap water to the hot water supply device 1 is calculated based on the detected flow rate of the water supply flow rate sensor 8***c* and the distribution ratio of the distribution valve 10.

The distribution valve 10 is controlled to increase the distribution ratio to the heat exchanger 3 side as the heating capacity required for hot water supply at the set hot water temperature increases. Further, the distribution valve 10 is controlled to reduce the total flow rate or to set the total flow rate to zero as needed.

Next, the distribution valve 10 is described.

Figure 2:
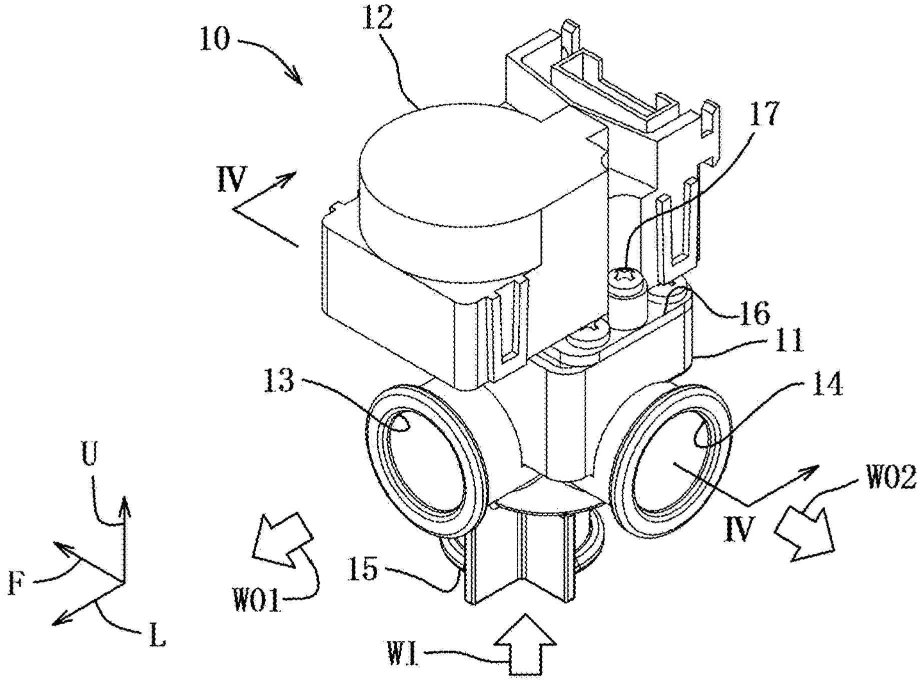
FIG. 2 is a perspective view of a distribution valve according to an embodiment of the disclosure.

As shown in FIG. 2, the distribution valve 10 has a valve main body 11 and a drive unit (driver) 12 having, for example, a stepping motor. Here, the description is based on the distribution valve 10 being equipped in the hot water supply device 1 with the drive unit 12 positioned on the upper side. In the figure, arrow U, arrow F, and arrow L represent the upward, forward, and leftward directions of the distribution valve 10, respectively. It is noted that the orientation of the distribution valve 10 may be appropriately changed depending on the device to which it is attached.

The valve main body 11 is formed, for example, of synthetic resin and has a first outlet 13 and a second outlet 14 on the side portion thereof, and an inlet 15 on the bottom portion thereof. The drive unit 12 is fixed to a mounting plate 16 on the upper portion of the valve main body 11 by a plurality of fastening members 17. The distribution valve 10 is interposed in the water supply passage 4 with the inlet 15 and the second outlet 14 connected to the water supply passage 4. The bypass passage 6 is connected to the first outlet 13. The tap water introduced into the inlet 15 heading upward, as indicated by arrow WI, is distributed into tap water supplied to the bypass passage 6 from the first outlet 13 as indicated by arrow WO1, and tap water supplied to the heat exchanger 3 from the second outlet 14, as indicated by arrow WO2.

Figure 3:
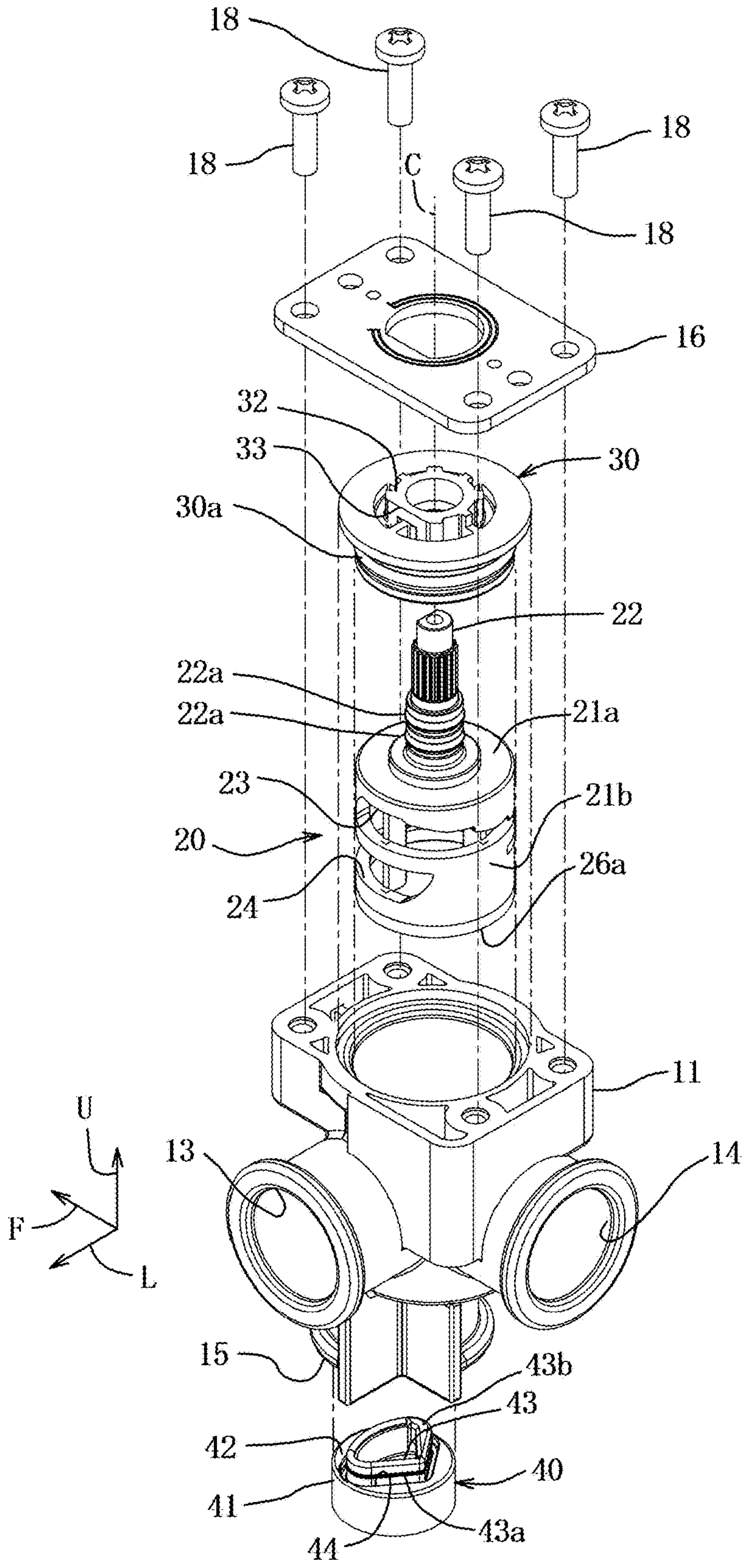
FIG. 3 is an exploded view of main parts of the distribution valve shown in FIG. 2.
Figure 4:
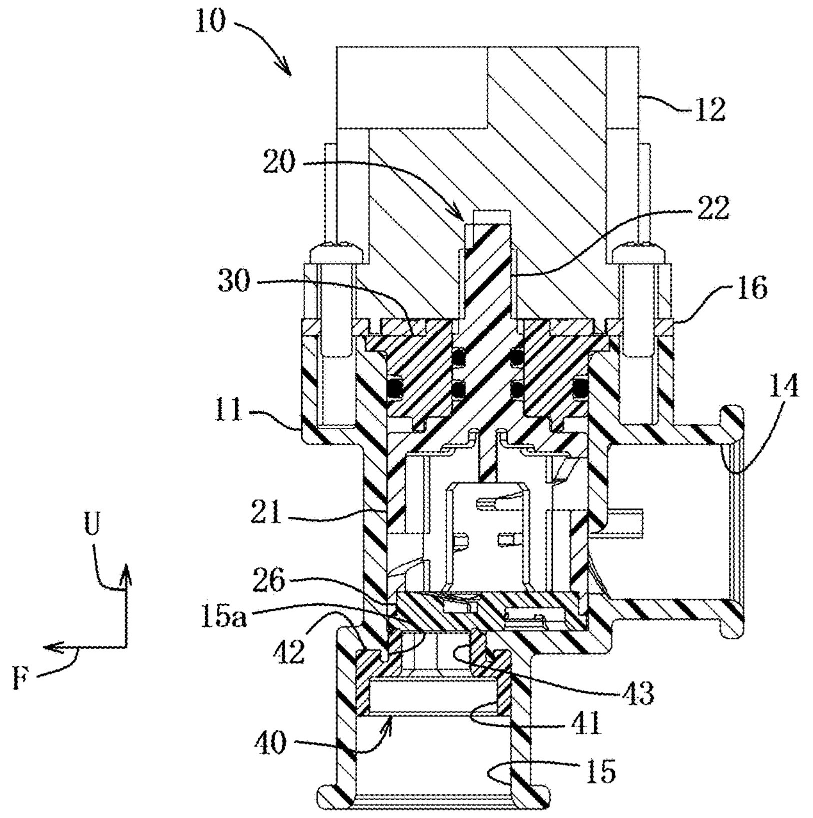
FIG. 4 is a vertical cross-sectional view along the line IV-IV of the distribution valve shown in FIG. 2.

As shown in FIG. 3 and FIG. 4, a cylindrical valve body 20, formed for example of synthetic resin, is fitted rotatably into the cylindrically formed space inside the valve main body 11. A valve shaft 22 extends from the top surface portion 21*a* covering the top surface of the valve body 20 to the outside of the valve main body 11, sharing the common center axis C with the valve body 20. A collar member 30, which rotatably supports this valve shaft 22, is fitted into the valve main body 11 together with the valve body 20. These valve body 20 and collar member 30 are prevented from falling out of the valve main body 11 by the mounting plate 16, which is fixed to the valve main body 11 with a plurality of fastening members 18. In order to rotationally drive the valve body 20 via the valve shaft 22 by the drive unit 12 fixed to this mounting plate 16, a part of the valve shaft 22 is subjected to serration processing. The internal structure of the drive unit 12 is omitted from the drawings and description.

Two O-rings 22*a* are fitted on the valve shaft 22 to provide a watertight seal between the valve shaft 22 and the collar member 30. Further, an O-ring 30*a* is fitted on the outer circumference of the collar member 30 to provide a watertight seal between the collar member 30 and the valve main body 11. A rotation regulation portion 33 is formed on the insertion portion 32 of the collar member 30, which is inserted through the mounting plate 16, to engage with the mounting plate 16 and prevent the collar member 30 from rotating along with the rotation of the valve main body 11.

Next, the valve body 20 is described.

Figure 5:
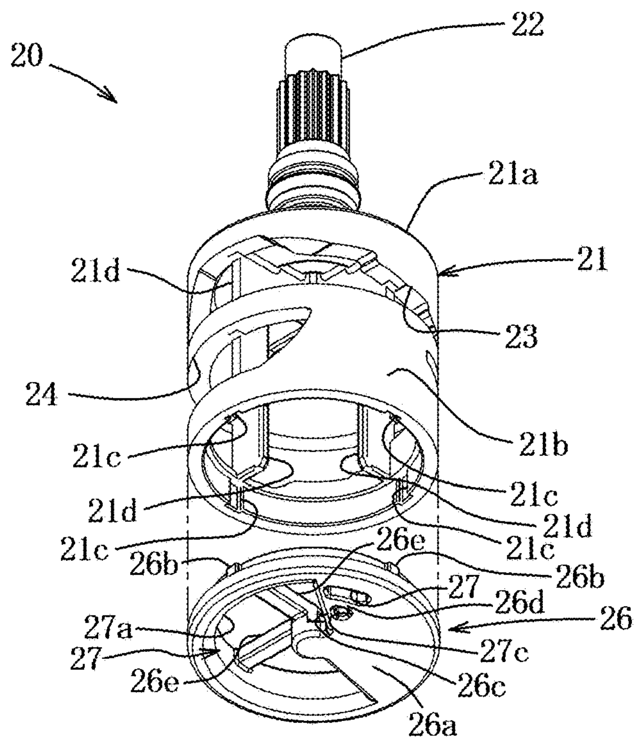
FIG. 5 is an exploded view of the valve body.
Figure 6:
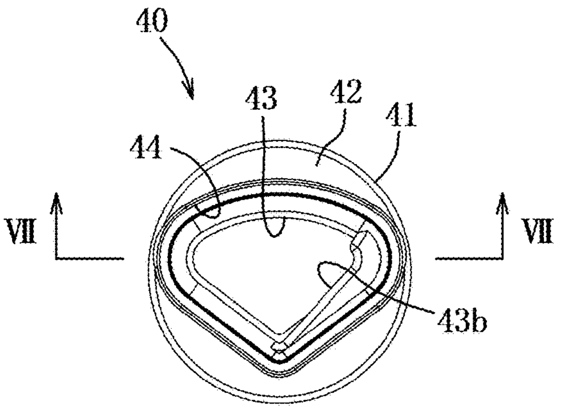
FIG. 6 is a plan view of the seal member.
Figure 7:
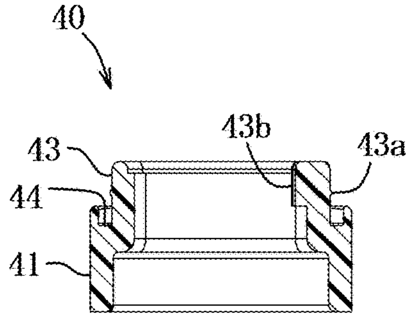
FIG. 7 is a cross-sectional view taken along line VII-VII of the valve seat member of FIG. 6.

As shown in FIG. 3 and FIG. 5, the valve body 20 is formed by fitting a disc-shaped second valve body 26 having a bottom surface portion 26*a* into the open end portion of a first valve body 21 having a cylindrical peripheral wall portion 21*b* and a top surface portion 21*a*. On the inner wall of the peripheral wall portion 21*b* of this open end portion, a plurality of key grooves 21*c* are formed. The second valve body 26 has a plurality of keys 26*b* corresponding to the plurality of key grooves 21*c* of the first valve body 21.

The plurality of key grooves 21*c* and the corresponding plurality of keys 26*b* prevent relative rotation between the first valve body 21 and the second valve body 26, as well as provide circumferential positioning, allowing the first valve body 21 and the second valve body 26 to rotate integrally. The peripheral wall portion 21*b* slides against the inner circumferential surface surrounding the side surface of the cylindrically formed space inside the valve main body 11, and functions as a seal surface portion to close the first outlet 13 and the second outlet 14 of the valve main body 11. The bottom surface portion 26*a* functions as a seal surface portion to close the inlet 15 of the valve main body 11.

The first valve body 21 has a first opening portion 23 on the upper side (top surface portion 21*a* side) of the peripheral wall portion 21*b* to connect the internal space of the valve body 20 with the first outlet 13. This first valve body 21 has a second opening portion 24 on the lower side (open end portion side) of the peripheral wall portion 21*b* to connect the internal space of the valve body 20 with the second outlet 14. The first opening portion 23 and the second opening portion 24 are formed such that the axial opening widths (heights) thereof change respectively as they move in the circumferential direction. Further, the first valve body 21 has a plurality of reinforcement ribs 21*d* formed to protrude into the internal space to reinforce the peripheral wall portion 21*b* and the top surface portion 21*a*. These reinforcement ribs 21*d* suppress the radial and axial deformation of the first valve body 21.

The second valve body 26 has a third opening portion 27 to connect the internal space of the valve body 20 with the inlet 15. The third opening portion 27 is divided into a large opening portion 27*a* and a small opening portion by a bar 26*c* extending in the radial direction of the bottom surface portion 26*a*, and the small opening portion is divided into a small opening portion 27*b* and a small opening portion 27*c* by a bar 26*d* extending in the circumferential direction. The bottom surface portion 26*a* has a circular annular outer circumferential part, a fan-shaped part connecting between this circular annular outer circumferential part and the central part thereof, and bars 26*c* and 26*d*, occupying approximately half of the projection area in the axial direction of the valve body 20. To suppress the deformation (axial displacement) of this bottom surface portion 26*a*, a plurality of reinforcement ribs 26*e* are radially formed on the bottom surface portion 26*a* on the side facing the internal space of the valve body 20, connecting the circular annular outer circumferential portion with the central portion thereof.

Next, the seal member 40 is described.

As shown in FIG. 3, FIG. 4, FIG. 6, and FIG. 7, a seal member 40, which is formed in a tubular shape from an elastic material such as fluorine-based synthetic resin, is fitted into the connecting portion 15*a* of the inlet 15 at the bottom portion of the valve main body 11. The seal member 40 has a cylindrical portion 41 formed in a cylindrical shape to contact the inner wall of the inlet 15, a top surface portion 42, and a lip portion 43 that extends from the top surface portion 42 toward the valve body 20 and seals by contacting the bottom surface portion 26*a* of the valve body 20. On the top surface portion 42, a groove 44 is formed along the base end part of the lip portion 43 to surround the outer circumference of the lip portion 43.

The lip portion 43 is formed in a tubular shape with an approximately fan-shaped opening, and the inside of the tubular lip portion 43 and the inside of the cylindrical portion 41 allow the inlet 15 and the internal space of the cylindrical valve body 20 to be connectable. Further, on the lip portion 43, a protrusion portion 43*a* that protrudes outward is formed to extend around the outer circumference of the lip portion 43. The seal member 40 fitted into the connecting portion 15*a* has at least the protrusion portion 43*a* adhered to the inner wall of the connecting portion 15*a* to prevent falling off while being movable in the axial direction of the valve body 20. Next, the seal member 40 is pressed by the supply pressure of the fluid supplied to the inlet 15, causing the lip portion 43 and the groove 44 to adhere to the connecting portion 15*a*, while the top surface portion 42 is adhered to the bottom portion of the valve main body 11 inside the inlet 15, thereby enabling sealing.

The lip portion 43 has a thickened portion 43*b* formed on a part of the tip end side part that contacts the bottom surface portion 26*a* of the valve body 20, where the thickness of the tube is greater than other parts of the lip portion 43. This thickened portion 43*b* is formed to protrude toward the inside of the tubular lip portion 43 at the part facing the third opening portion 27 of the bottom surface portion 26*a* when the opening area of the inlet 15 is made zero (immediately before closing). Further, this thickened portion 43*b* is formed to become thicker as the position that contacts the bottom surface portion 26*a* during the closing of the inlet 15 is located more toward the radially outer circumference side of the bottom surface portion 26*a*, making the parts that are more prone to wear thicker while not hindering the flow of fluid.

Figure 8:
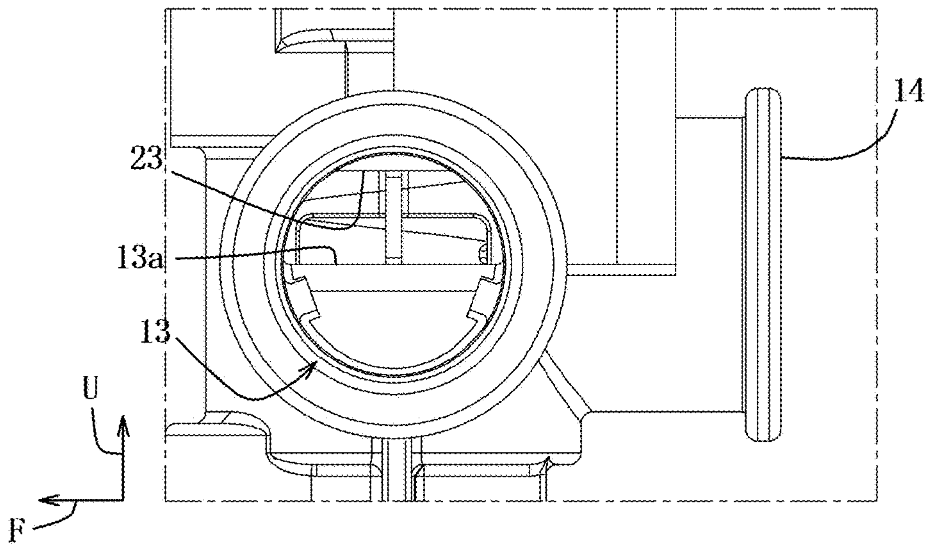
FIG. 8 is a diagram showing the initial state of the first outlet of the distribution valve of FIG. 2.
Figure 9:
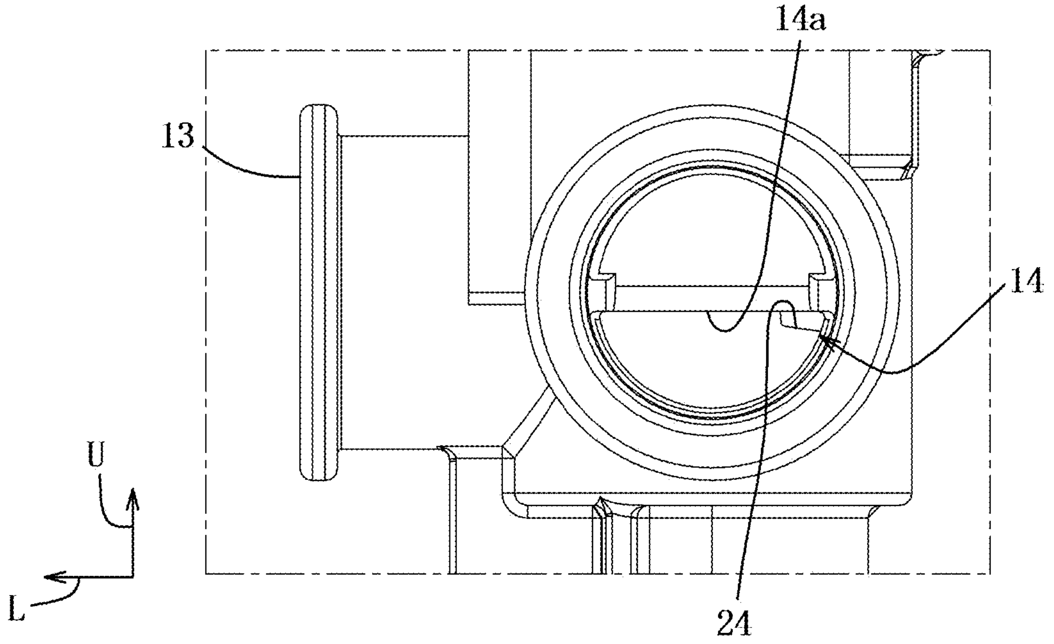
FIG. 9 is a diagram showing the initial state of the second outlet of the distribution valve of FIG. 2.
Figure 10:
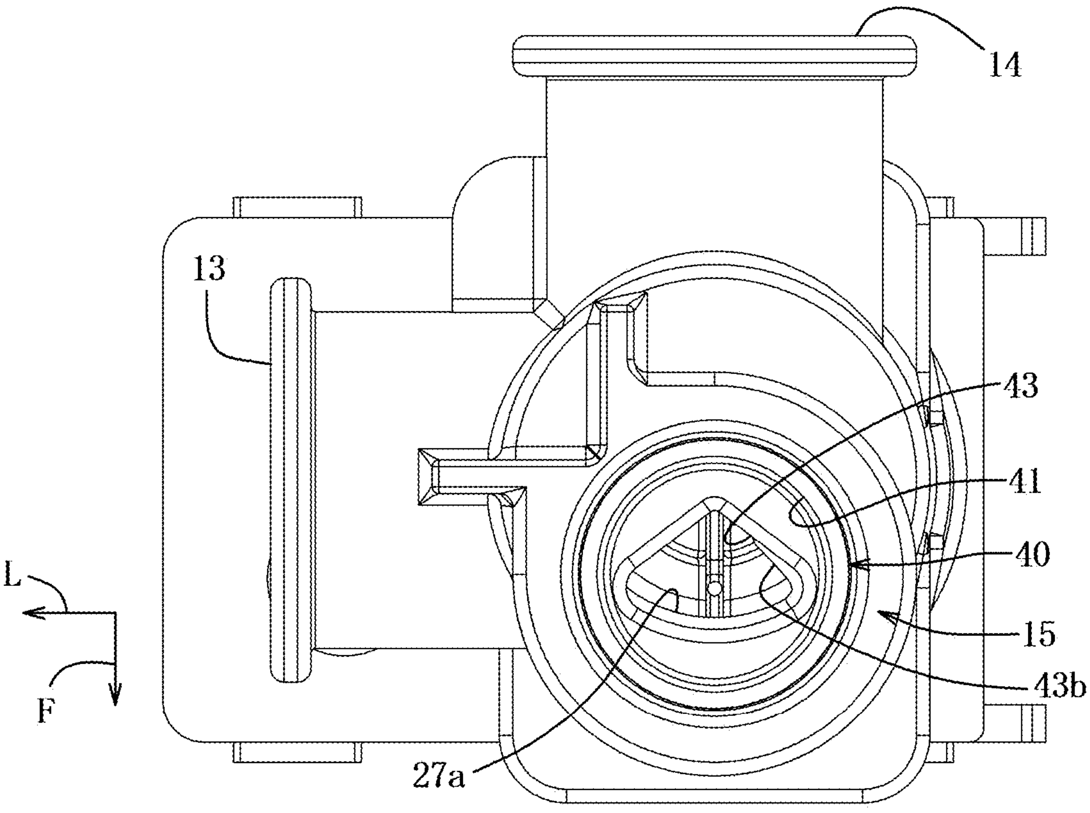
FIG. 10 is a diagram showing the initial state of the inlet of the distribution valve of FIG. 2.

As shown in FIG. 8, the first outlet 13 communicates with the internal space of the valve body 20 through a connecting portion 13*a*, which is opened in a semicircular shape with a straight lower end, and the first opening portion 23 of the valve body 20. Further, as shown in FIG. 9, the second outlet 14 communicates with the internal space of the valve body 20 through a connecting portion 14*a*, which is opened in a semicircular shape with a straight upper end, and the second opening portion 24 of the valve body 20. Then, as shown in FIG. 10, the inlet 15 equipped with the seal member 40 communicates with the internal space of the valve body 20 through the inside of the cylindrical portion 41 of the seal member 40, the inside of the fan-shaped lip portion 43, and the third opening portion 27 of the valve body 20.

The opening area of the first opening portion 23 that communicates with the first outlet 13 (the opening area of the first outlet 13), the opening area of the second opening portion 24 that communicates with the second outlet 14 (the opening area of the second outlet 14), and the opening area of the third opening portion 27 that communicates with the inlet 15 (the opening area of the inlet 15) each change within a predetermined range that is set in advance by the rotation of the valve body 20. Here, as shown in FIG. 8 and FIG. 9, when the opening area of the first outlet 13 is maximum, the opening area of the second outlet 14 is minimum, and as shown in FIG. 10, when the opening area of the inlet 15 is approximately fully open, this is defined as the initial state where the rotation angle of the valve body 20 is 0 degrees. It is noted that the predetermined range is from maximum to zero (closed) for the inlet 15 and from a non-zero minimum to maximum for the first outlet 13 and the second outlet 14. However, when the inlet 15 is closed, the first outlet 13 and the second outlet 14 may also be closed.

When the valve body 20 in the initial state is rotated clockwise (clockwise when viewed from above), the opening area of the first outlet 13 and the second outlet 14 changes, and the opening area of the inlet 15 changes. Thus, by rotating the valve body 20, it is possible to perform adjustment of the distribution ratio and adjustment of the total flow rate according to the rotation angle of the valve body 20. It is noted that the valve body 20 is rotated at a rotation angle of, for example, between 0 degrees and 270 degrees, and does not make a complete rotation.

Figure 11:
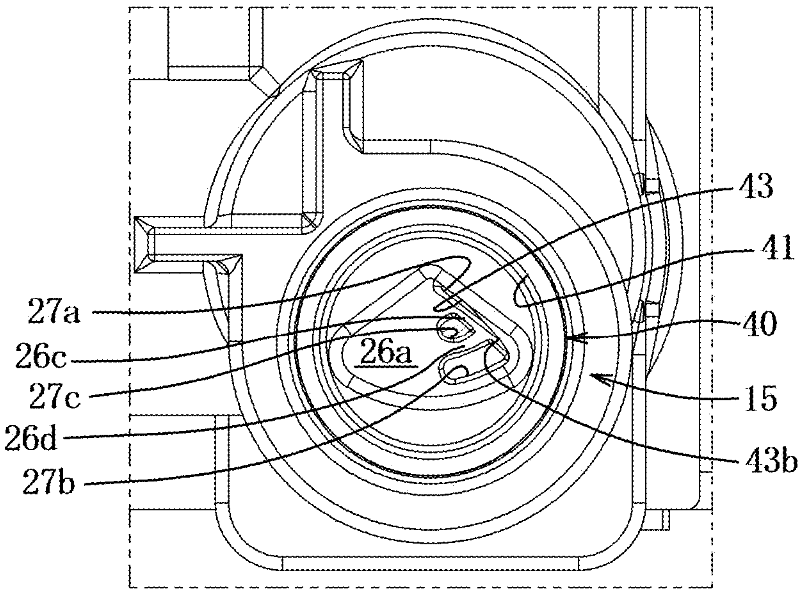
FIG. 11 is a diagram showing the state immediately before the inlet of the distribution valve of FIG. 2 is closed.

As the valve body 20 is further rotated clockwise, the opening area of the inlet 15 becomes smaller, and finally, when the rotation angle is, for example, 240 degrees, the inlet 15 is closed, resulting in a closed state with zero total flow rate. At this time, due to the supply pressure of the tap water supplied to the inlet 15, the seal member 40 is pressed toward the valve body 20, and the tip end side of the lip portion 43 adheres closely to the bottom surface portion 26*a*. When the opening area of the inlet 15 becomes zero (immediately before being closed), as shown in FIG. 11, the thickened portion 43*b* formed on the lip portion 43 faces the third opening portion 27, and the other parts of the lip portion 43 contact the bottom surface portion 26*a*.

Immediately before the inlet 15 is closed, the seal member 40 receives force from the fluid toward the valve body 20, causing the tip end side of the lip portion 43 to slightly elastically deform and adhere to the bottom surface portion 26*a*, and a part of the lip portion 43 is slightly pulled into and enters the opening portion 27 (large opening portion 27*a* or small opening portions 27*b* and 27*c*). By reducing the opening area of the inlet 15 while this part of the lip portion 43 is still inserted into the opening portion 27, the lip portion 43 is caught in the opening portion 27 which is becoming smaller, and wear of the lip portion 43 progresses more rapidly. However, since the thickened portion 43*b* is formed at the part facing the opening portion 27 immediately before the inlet 15 is closed, the thickened portion 43*b* becomes difficult to enter the opening portion 27 and less likely to be caught in the opening portion 27 which is becoming smaller, thereby enabling the suppression of wear on the lip portion 43.

Figure 12:
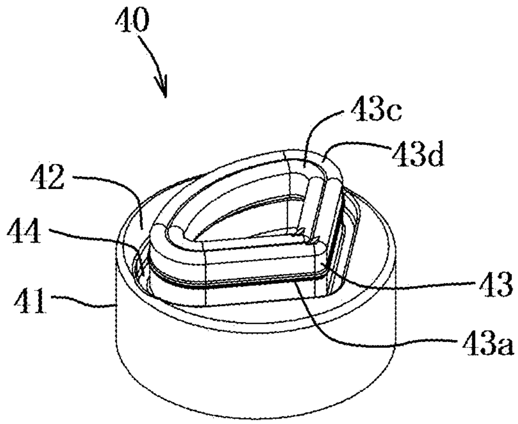
FIG. 12 is a perspective view showing another example of the seal member.

In FIG. 12, an example of a seal member 40 with a modified lip portion 43 is shown. The entire tip end side part of the tubular lip portion 43 protrudes inward and is formed thicker than the base end side, and double annular protrusion portions 43*c* and 43*d* that protrude toward the bottom surface portion 26*a* are formed at its tip end. As described above, by making the tip end side of the lip portion 43 thicker to suppress wear, and by using double annular protrusion portions 43*c* and 43*d*, the frictional resistance between them and the bottom surface portion 26*a* may be reduced. Although not shown in the figures, for reinforcement of the double annular protrusion portions 43*c* and 43*d*, a plurality of connection portions that connect between the inner annular protrusion portion 43*c* and the outer annular protrusion portion 43*d* may also be formed at appropriate intervals.

The following describes the action and effects of the aforementioned distribution valve 10.

The distribution valve 10 distributes fluid introduced from the inlet 15 into the cylindrical valve body 20 to the first outlet 13 and the second outlet 14. Then, by rotating the valve body 20, the distribution ratio and total flow rate are adjusted. At the inlet 15, a tubular seal member 40 that contacts the bottom surface portion 26*a* of the valve body 20 is arranged. This seal member 40 has a lip portion 43 that adheres to the bottom surface portion 26*a* of the valve body 20, and in the part of the lip portion 43 that faces the third opening portion 27 of the valve body 20 when the opening area of the inlet 15 becomes minimum, a thickened portion 43*b* that is thicker than other parts of the lip portion 43 is formed. Since the thickened portion 43*b* becomes more difficult to deform while maintaining sealing properties due to its increased thickness, when rotating the valve body 20 to reduce the opening area of the inlet 15, the thickened portion 43*b* becomes less likely to be caught in the third opening portion 27, and wear of the lip portion 43 caused by the closing function may be suppressed. Further, due to the increased thickness, the allowable wear amount to maintain sealing properties increases, and the durability of the distribution valve 10 is improved.

The seal member 40 receives the supply pressure of fluid and moves toward the valve body 20, and the lip portion 43 adheres closely to the bottom surface portion 26*a* of the valve body 20. Thus, even if the lip portion 43 wears, since the seal member 40 is pressed toward the bottom surface portion 26*a* of the valve body 20, the lip portion 43 may be made to adhere closely to the bottom surface portion 26*a*, and the durability of the distribution valve 10 is improved.

The bottom surface portion 26*a* has a bar 26*d* extending in the circumferential direction that divides the third opening portion 27 so as to contact the thickened portion 43*b* immediately before closing when the opening area of the inlet 15 becomes zero. When the opening area of the inlet 15 is reduced by the rotation of the valve body 20, the thickened portion 43*b* tends to be pulled into the third opening portion 27 by the fluid flowing into the third opening portion 27, but the pulling of the thickened portion 43*b* may be suppressed by the bar 26*d* provided in the third opening portion 27 extending in the circumferential direction. Thus, when the valve body 20 is rotated to close the inlet 15, the thickened portion 43*b* of the lip portion 43 becomes more difficult to be caught in the third opening portion 27, and the wear of the lip portion 43 may be suppressed.

The distribution valve 10 is applicable to devices other than the hot water supply device 1, and the fluid may be something other than tap water. Furthermore, those skilled in the art may implement various modification examples to the aforementioned embodiment without departing from the spirit of the disclosure, and the disclosure encompasses such modification examples.

What is claimed is:

1. A distribution valve, comprising: a valve main body, having a first outlet, a second outlet, and an inlet; a cylindrical valve body, rotatably fitted into the valve main body; and a driver, configured to rotate the valve body through a valve shaft extending from a top surface portion of the valve body, wherein the valve body has a peripheral wall portion that functions as a seal surface portion that closes the first outlet and the second outlet, and a bottom surface portion that functions as a seal surface portion that closes the inlet, the peripheral wall portion is formed with a first opening portion and a second opening portion configured to continuously change an opening area of the first outlet and an opening area of the second outlet by rotation of the valve body, the bottom surface portion is formed with a third opening portion configured to change an opening area of the inlet within a predetermined range by rotation of the valve body, and the distribution valve distributes fluid flowing from the inlet into the valve body to the first outlet and the second outlet, wherein a seal member having a lip portion for adhering to the bottom surface portion is fitted into the inlet, and the lip portion has a thickened portion that is formed thicker than other parts at a part of the lip portion facing the third opening portion immediately before an opening area of the inlet becomes zero by rotation of the valve body.

2. The distribution valve according to claim 1, wherein the seal member is configured to be movable in an axial direction of the valve body and be pressed toward the valve body by a supply pressure of fluid acting on the inlet, such that the lip portion adheres to the bottom surface portion.

3. The distribution valve according to claim 1, wherein the bottom surface portion has a bar extending in a circumferential direction that divides the third opening portion, and the bar is configured to contact the thickened portion when an opening area of the inlet becomes minimum.

4. The distribution valve according to claim 2, wherein the bottom surface portion has a bar extending in a circumferential direction that divides the third opening portion, and the bar is configured to contact the thickened portion when an opening area of the inlet becomes minimum.

* * * * *